(12) United States Patent
Kimura et al.

(10) Patent No.: US 9,632,322 B2
(45) Date of Patent: Apr. 25, 2017

(54) DISPLAY APPARATUS

(71) Applicant: Sharp Kabushiki Kaisha, Osaka (JP)

(72) Inventors: Tomohiro Kimura, Osaka (JP); Kohji Fujiwara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/025,233

(22) PCT Filed: Jul. 22, 2014

(86) PCT No.: PCT/JP2014/069325
§ 371 (c)(1),
(2) Date: Mar. 25, 2016

(87) PCT Pub. No.: WO2015/045590
PCT Pub. Date: Apr. 2, 2015

(65) Prior Publication Data
US 2016/0238853 A1    Aug. 18, 2016

(30) Foreign Application Priority Data
Sep. 30, 2013   (JP) ................. 2013-205547

(51) Int. Cl.
*G02B 7/182*   (2006.01)
*G02B 27/14*   (2006.01)
*G02F 1/1333*   (2006.01)
*G02F 1/1335*   (2006.01)
*H05K 5/00*   (2006.01)

(52) U.S. Cl.
CPC .......... *G02B 27/144* (2013.01); *G02B 7/182* (2013.01); *G02F 1/133308* (2013.01); *G02F 1/133555* (2013.01); *H05K 5/0017* (2013.01); *G02F 2001/133322* (2013.01); *G02F 2001/133557* (2013.01); *G02F 2001/133562* (2013.01)

(58) Field of Classification Search
CPC ............. G02F 1/1335; G02F 1/133308; G02F 1/133555; G02F 2001/133322; G02F 2001/133557; G02F 2001/133562; G02F 9/00; G02B 7/182; G02B 27/144; H01L 27/32
USPC ........................................................ 359/839
See application file for complete search history.

(56) References Cited

U.S. PATENT DOCUMENTS

2014/0160411 A1* 6/2014 Yim .................. G02F 1/133553
349/113

FOREIGN PATENT DOCUMENTS

| JP | 2000-196718 A | 7/2000 |
| JP | 2002-236455 A | 8/2002 |
| JP | 2004-126498 A | 4/2004 |

* cited by examiner

*Primary Examiner* — Euncha Cherry
(74) *Attorney, Agent, or Firm* — Chen Yoshimura LLP

(57) ABSTRACT

A display device is provided with: a display module that is provided with a first display region and a second display region; an optical member that faces the second display region, and that has a transmissive mirror portion; and a positioning member. The display module and the optical member respectively have end faces in contact with the positioning member, and end faces as free ends.

10 Claims, 10 Drawing Sheets

(a)

(b)

(a)

(b)

(a)

(b)

DISPLAY APPARATUS

TECHNICAL FIELD

The present invention relates to a display device that includes a display module and a transparent member having a transmissive mirror portion.

BACKGROUND ART

In recent years, many display devices that include a transmissive mirror portion with the display surface thereof being provided on the rear of the transmissive mirror portion, or electronic devices including such a display device have been proposed. The transmissive mirror portion is made of a reflective or scattering material that can transmit light, the transmissive mirror portion transmitting a portion of the light and reflecting or scattering a portion of the light.

Patent Document 1, for example, discloses a mobile electronic device in which a mirrored surface portion forming a half mirror as the transmissive mirror portion is attached to the front surface of a case. A holder that houses a display module including a liquid crystal display is bonded to or at a small gap from the rear of the half mirror in the mobile electronic device.

Patent Document 2 discloses a terminal device in which a blind sheet is bonded to a display in a display module or to part or all of a transparent panel housed inside the display. In the blind sheet, a half mirror is formed as a transmissive mirror portion on part or all of a surface of a transparent film to be the support body.

Patent Document 3 discloses a display body that includes a display region including a liquid crystal panel and a one-way mirror portion stacked on the display region. The liquid crystal panel is provided with a state display region and a content display region, and a transparent transmissive region is formed in the section of the one-way mirror portion located over the state display region. Also, a transflective region having a reflective film is formed as a transmissive mirror portion in the section of the one-way mirror portion located over the content display region.

RELATED ART DOCUMENTS

Patent Documents

Patent Document 1: Japanese Patent Application Laid-Open Publication, "Japanese Patent Application Laid-Open Publication No. 2000-196718 (Published on Jul. 14, 2000)"

Patent Document 2: Japanese Patent Application Laid-Open Publication, "Japanese Patent Application Laid-Open Publication No. 2004-126498 (Published on Apr. 22, 2004)"

Patent Document 3: Japanese Patent Application Laid-Open Publication, "Japanese Patent Application Laid-Open Publication No. 2002-236455 (Published on Aug. 23, 2002)"

SUMMARY OF THE INVENTION

Problems to be Solved by the Invention

However, the above-mentioned conventional display device has a problem in that the positional accuracy of the transmissive mirror portion with respect to images displayed in the display screen is low.

As described above, in Patent Document 1, the display module is disposed so as to be bonded to a half mirror or provided at a gap from the half mirror. However, when attaching an optical member (hereinafter referred to as a "transmissive mirror") in which a transmissive mirror is provided on a case as in Patent Document 1, for example, when the transmissive mirror is positioned away from the display surface, this results in positional offset in the image as a result of parallax.

In order to mitigate positional offset of images resulting from parallax, it is preferable that the transmissive mirror be provided as close to the display surface as possible.

One method to do so is to bond the transmissive mirror to the display surface as in Patent Document 2, for example.

However, a polarizing plate is typically provided on the surface of a display such as a liquid crystal display. Thus, when bonding the transmissive mirror to the display surface as in Patent Document 1, for example, the transmissive mirror would be bonded onto the polarizing plate.

However, polarizing plates are typically made of a resin material that is susceptible to deformation, warping, or the like due to heat. Thus, bonding accuracy between the polarizing plate and the transmissive mirror is low.

Also, even if the polarizing plate and transmissive mirror were bonded together accurately, it is very difficult to position together the panel portion constituting the main display body and the transmissive mirror bonded to the polarizing plate. In addition, as a result of the polarizing plate being susceptible to deformation, warping, or the like due to heat as described above, even after the panel portion and the polarizing plate are positioned together and manufacturing of the product is completed, there is a high probability of positional offset occurring due to thermal deformation of the polarizing plate.

Similarly, positioning of the display region including the liquid crystal panel with the one-way mirror portion as in Patent Document 3, and positioning of the half mirror provided on the front surface of the case with the holder, which houses the display module housed in the space inside the case, as in Patent Document 1 are difficult.

Furthermore, when providing two display regions (display regions) in the liquid crystal panel and providing a transmissive region and a transflective region, respectively, in positions of the one-way mirror position on the display regions as in Patent Document 3, the tolerance, thermal expansion and contraction, and the like when assembling the display body mean that there is a high probability of positional offset between the boundary between the transmissive region and the transflective region, and the respective display regions. In particular, if a portion of the image to be displayed through one region (such as the transflective region) is displayed through the other region (such as the transmissive region), this results in display that does not conform to what the content distributor intended, which can result in confusion on the part of the user. Thus, the display body disclosed in Patent Document 3 is not suited to displaying highly public content such as television broadcasts.

The present invention takes into account such problems, and an object thereof is to provide a display device by which it is possible to mitigate positional offset between one of two display regions in a display module, and a transmissive mirror arranged so as to correspond with the display region.

Means for Solving the Problems

In order to solve the above-mentioned problem, a display device according to one aspect of the present invention includes: a display module having a display surface provided with first and second display regions; a transparent substrate having a transmissive mirror portion formed thereon in an area that faces and covers the second display region; and a positioning member that fixes the display module and the transparent substrate relative to each other, wherein end faces of the display module and the transparent substrate adjacent to the second display region are in contact with the positioning member, whereas end faces of the display module and the transparent substrate adjacent to the first display region are free ends that are not in contact anywhere.

Effects of the Invention

According to one aspect of the present invention, it is possible to set the transparent member provided with the transmissive mirror portion as close as possible to the display surface of the display module without directly bonding the transmissive mirror to the polarizing plate. In this manner, it is possible to attain a parallaxless effect equivalent to when the polarizing plate is directly bonded to the transmissive mirror. Furthermore, compared to directly bonding the transmissive mirror to the polarizing plate, it is possible to mitigate positional offset between the boundary between the first display region and the second display region, and the transmissive mirror edge.

Also, according to an aspect of the present invention, it is possible to position the display module and the transparent member with ease.

Additionally, the second display region and the transmissive mirror portion are disposed towards the positioning member, which undergoes little displacement, and thus, positional offset of the transmissive mirror portion with respect to the second display region is suppressed, and the processing dimensional accuracy and assembly accuracy of the display device can be improved.

The end faces of the display module and the transparent member towards the first display region are free ends, and thus, displacement variation (positional offset) of the end faces towards the first display region resulting from thermal expansion or contraction can be prevented from reaching the second display region (transmissive mirror portion).

Thus, according to one aspect of the present invention, it is possible to mitigate positional offset between the second display region and the transmissive mirror portion, and to improve positioning accuracy of the second display region and transmissive mirror portion.

DETAILED DESCRIPTION OF EMBODIMENTS

Below, embodiments of the present invention will be explained in detail.

21 Embodiment 1>

An embodiment according to the present invention is as described below with reference to FIGS. 1(*a*), 1(*b*), and 2.

(Schematic Configuration of Display Device 1)

Figure 1:
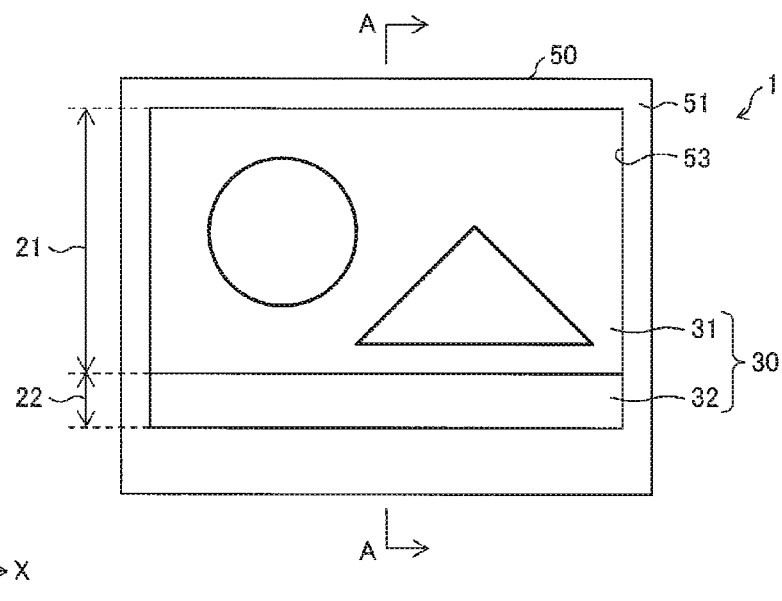
FIG. 1(*a*) is a front view of a schematic configuration of a display device of Embodiment 1 of the present invention, and FIG. 1(*b*) is a cross-sectional view of the display device shown in FIG. 1(*a*) along the line A-A.
Figure 1:
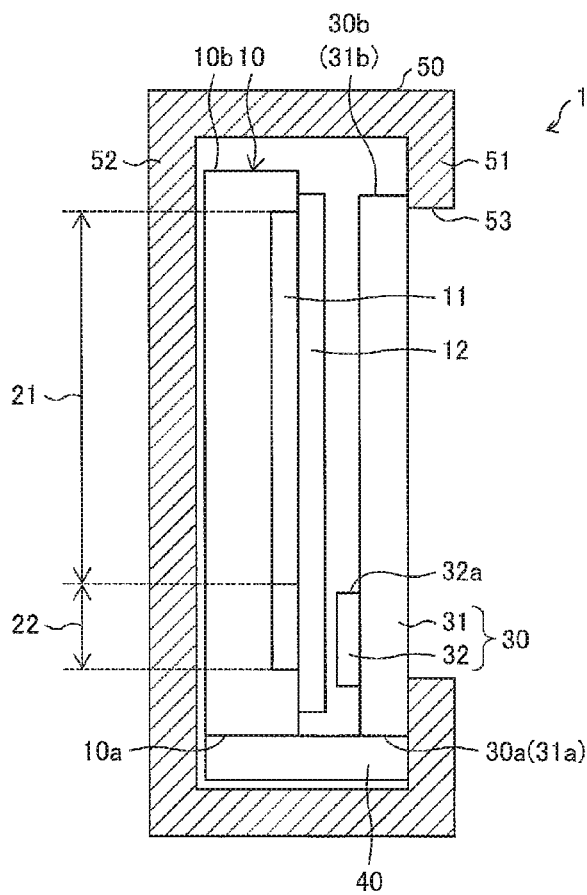

FIG. 1(*a*) is a front view of a schematic configuration of a display device 1 of the present embodiment, and FIG. 1(*b*) is a cross-sectional view of the display device 1 shown in FIG. 1(*a*) along the line A-A.

As shown in FIGS. 1(*a*) and 1(*b*), the display device 1 includes a display module 10, an optical member 30, a positioning member 40 (positioning mechanism), and a case 50. The display device 1 includes both a transmissive display region and a transflective display region.

Below, in FIGS. 1(*a*) and 1(*b*), the Z axis direction is designated as the row direction (upper direction) of the display module 10 and the two axis directions in the horizontal direction perpendicular to the Z axis are respectively the X axis direction and the Y axis direction, of which the X axis direction is designated as the column direction of the display module 10.

(Optical Member 30)

The optical member 30 is a transmissive member provided with a transmissive mirror portion 32 on at least a portion of a transparent support substrate 31. In the present embodiment, as shown in FIGS. 1(*a*) and 1(*b*), the transmissive mirror portion 32 is provided on a portion of the support substrate 31.

The support substrate 31 is made of a highly transparent substrate such as glass or acrylic. On the other hand, the transmissive mirror portion 32 is made of a reflective or scattering material that can transmit light, the transmissive mirror portion transmitting a portion of the light and reflecting or scattering a portion of the light.

A half mirror (half-transparent mirror) or the like formed by vapor deposition of a metal such as aluminum can be used for the transmissive mirror portion 32, for example. The transmissive mirror portion 32 may be formed by bonding to the support substrate 31 a sheet-form transmissive mirror member, for example, that is made by vapor deposition of a metal on a support body that is separate from the support substrate 31 and that includes an adhesive layer or the like, or may be formed by directly vapor-depositing the metal onto the support substrate 31.

The optical member 30 is provided on the display surface side of the display module 10 so as to oppose the display module 10. In addition, the transmissive mirror portion 32 is provided on the display module 10 side of the support substrate 31 so as to face a second display region 22.

(Display Module 10)

The display module 10 includes a display unit 11, and also includes a polarizing plate 12 (front polarizing plate) provided on the display surface side of the display unit 11. Although not shown, the display module 10 includes parts necessary for displaying images in the display unit 11 such as a polarizing plate (rear polarizing plate) provided on the side of the display unit 11 opposite to the display surface, a backlight frame provided with a backlight, and a circuit substrate for displaying images in the display unit 11.

A liquid crystal panel is used for the display unit 11 of the display module 10, for example. However, the display panel used for the display unit 11 is not limited to a liquid crystal panel and may be an organic EL (electroluminescent) panel, an inorganic EL panel, a plasma panel, or the like. Thus, the front polarizing plate, the rear polarizing plate, the backlight, and the like are not essential.

The configuration of such display panels is the same as typical display panels used in conventional display devices, and thus, descriptions and depictions of detailed portions are omitted. The configuration of the backlight or the like is also the same as what is used in conventional display devices, and thus, descriptions and depictions of detailed portions are omitted.

The display module 10 includes a first display region 21 (main region) and the second display region 22 (subregion) on the same surface (same display surface). In other words, the display surface of the display unit 11 is divided into the first display region 21 and the second display region 22.

A first image based on a first image signal is displayed in the first display region 21, for example. A second image based on a second image signal differing from that of the first display region 21 is displayed in the second display region 22. The first image is a main content image, for example, and the second image is a sub-content image, for example.

The aspect ratio of the first display region 21 is 16:9, for example, and the first display region 21 can display full HD (high definition) images. In addition, the aspect ratio of the second display region 22 is 16:1.

The first display region 21 (16:9 region, for example) is a transmissive display region while the second display region 22 (16:1 region, for example) is a transflective display region. A transmissive mirror portion 32 of the optical member 30 is disposed on the display surface side of the second display region 22 in the display module 10.

As shown in FIG. 1(b), the height in the Z axis direction from the surface of the positioning member 40 to the far end (top end 32a) of the transmissive mirror portion 32 of the optical member 30 is set so as to be substantially the same as the Z direction height from the surface of the positioning member 40 to the far end of the second display region 22 (top end; boundary with first display region 21) (strictly speaking, the boundary between the first display region 21 and the second display region 22 is slightly higher than the top end 32a of the transmissive mirror portion 32).

As shown in FIGS. 1(a) and 1(b), the support substrate 31 is formed to a size allowing it to cover the first display region 21 and the second display region 22 when the display device 1 is viewed from the viewer side (that is, from the viewer side when the display module 10 and the optical member 30 are fixed to the positioning member 40). The transmissive mirror portion 32 is formed to a size allowing it to cover the second display region 22 when the display device 1 is viewed from the viewer side. In other words, with the first display region 21 being a 16:9 region and the second display region 22 being a 16:1 region, for example, the support substrate 31 has a size covering a 16:10 region.

The image displayed in the first display region 21 can be seen through a region of the support substrate 31 where the transmissive mirror portion 32 is not located. The image displayed in the second display region 22 can be seen through the transmissive mirror portion 32.

(Positioning Member 40)

The positioning member 40 is used when positioning together the display module 10 and the optical member 30. As shown in FIG. 1(b), the positioning member 40 is provided so as to be in contact with end faces 10a and 30a of the display module 10 and the optical member 30 towards the second display region 22 (in other words, end faces 10a and 30a towards which the transmissive mirror portion 32 of the optical member 30, which is toward the transflective region, is formed). Specifically, the end face 30a of the optical member 30 towards the second display region 22 refers to the end face 31a of the support substrate 31 towards the second display region 22.

The display module 10 and the optical member 30 of the present embodiment are both fixed to the positioning member 40 at the end faces 10a and 30a towards the second display region 22, among the first display region 21 and the second display region 22, whereas end faces 10b and 30b (that is, the end faces 10b and 30b towards the first display region 21) on the side opposite to the end faces 10a and 30a towards the second display region 22 are free ends (in other words, not fixed anywhere) that are not in contact anywhere.

Thus, gaps are formed respectively between the end faces 10b and 30b of the display module 10 and the optical member 30 towards the first display region 21, and the case 50. The display module 10 and the optical member 30 are, respectively, supported by the case 50 and the positioning member 40 at portions outside of the end faces 10b and 30b towards the first display region 21.

A plate shaped member made of a resin or metal material, for example, is used for the positioning member 40. A plastic plate is an example of a plate-shaped member made of a resin material. A plate made of aluminum, iron, or the like is an example of a plate-shaped member made of a metal material.

There is no special limitation on the method to fix the display module 10 and the optical member 30 to the positioning member 40, and various publicly known fixing methods such as bonding, usage of screws, or engagement can be applied, for example. When engaging the display module 10 and the optical member 30 to the positioning member 40, a groove (engaging groove), which is not shown, of the positioning member 40 needs to be provided with the display module 10 and the optical member 30 being engaged with the groove. A plurality of protrusions as stoppers may be provided in the positioning member 40 instead of providing the positioning member 40 with grooves. In such a case, by providing the protrusions with a biasing force applied to the display module 10 and the optical member 30, the display module 10 and the optical member 30 can easily be attached/detached to/from the positioning member 40.

(Case 50)

The display module 10, the optical member 30, and the positioning member 40 are housed in the case 50. The case 50 is constituted of a front case portion 51 (first case portion) provided on the display surface side of the display module 10 and a rear case portion 52 (second case portion) provided on the rear surface side (opposite to the display surface side) of the display module 10.

The front case portion 51 is provided with an opening 53 through which images displayed in the display device 1 are seen. Either one of the front case portion 51 and the rear case portion 52 is formed to have an L-shaped cross-section, for example, with the display module 10, the optical member 30, and the positioning member 40 being sandwiched between the front case portion 51 and the rear case portion 52.

A small gap is provided between the case 50 and the display module 10, the optical member 30, and the positioning member 40, and the display module 10, the optical member 30, and the positioning member 40 are partially supported by the case 50 (by point contact with the case 50, for example) through a supporting portion (not shown) provided in the case 50, such that the display module 10, the optical member 30, and the positioning member 40 do not collapse.

(Gap Between Display Module 10 and Transmissive Mirror Portion 32)

In order to mitigate positional offset of images resulting from parallax, it is preferable that the transmissive mirror portion 32 be provided as close to the second display region 22 of the display module 10 as possible. In order to do so, it is preferable that the transmissive mirror portion 32 be provided on the display module 10 side of the support substrate 31 so as to face the second display region 22, as previously described, and it is preferable that the display module 10 and the optical member 30 be provided as close as possible to each other in the Y axis direction shown in FIG. 1(b).

Glass is a suitable material for the substrate of the display panel of the display module 10 or the support substrate 31 of the optical member 30, for example. The estimated thermal expansion or contraction of the glass during actual use is approximately 1 line (±0.15 mm) (0.1% (1 line/1080 lines) in a 16:9 full HD region of a TV image or the like, and approximately 0.3 mm in a 30 inch TV (television), for example). Thus, when suppressing positional offset from thermal expansion or contraction to within 1 pixel when viewed (observed) within a 20° viewing angle up or down, it is preferable that the gap between the display module 10 and the optical member 30 be kept to approximately 0.5 mm as calculated by tan 20°.

Thus, it is preferable that the gap between the display module 10 and the transmissive mirror portion 32 be 0.5 mm or less in a 30 inch display device 1, for example, and 1 mm or less in a 60 inch display device 1, for example (0.5 mm×60 inches/30 inches).

By setting the gap between the display module 10 and the transmissive mirror portion 32 to within that range, for example, it is possible to attain a parallaxless effect equivalent to when the polarizing plate 12 is directly bonded to the transmissive mirror.

(Effects)

As previously described, when attaching to a display device an optical member in which a transmissive mirror is provided, when the transmissive mirror is positioned away from the display surface, this results in positional offset in the image as a result of parallax. Thus, it is preferable that the transmissive mirror be provided as close to the display surface as possible. However, because the bonding accuracy between the polarizing plate and the transmissive mirror is not high, it is preferable that the transmissive mirror not be bonded directly on the polarizing plate.

In the present embodiment, as described above, the transmissive mirror portion 32 was provided on the support substrate 31 so as to face the second display region 22, and the end faces 10a and 30a of the display module 10 and the support substrate 31 towards the transmissive mirror portion 32 were fixed to the positioning member 40.

According to the present embodiment, by providing such a configuration, it is possible to set the optical member 30 provided with the transmissive mirror portion 32 as close as possible to the display surface of the display module 10 without directly bonding the transmissive mirror to the polarizing plate 12. In this manner, it is possible to attain a parallaxless effect equivalent to when the polarizing plate 12 is directly bonded to the transmissive mirror.

Furthermore, by the configuration above, compared to directly bonding the transmissive mirror to the polarizing plate 12, it is possible to mitigate positional offset between the display edge between the first display region 21 and the second display region 22 (in other words, the boundary between the first display region 21 and the second display region 22) and the transmissive mirror edge. In order to mitigate the positional offset by parallax, it is preferable that the gap between the display module 10 and the optical member 30 be within the range previously described.

According to the present embodiment, it is possible to position with ease the display module 10 and the optical member 30 by fixing in place the display module 10 and the optical member 30 provided with the transmissive mirror portion 32 using the positioning member 40.

Furthermore, in the present embodiment, the end faces 10a and 30a of the display module 10 and the support substrate 31 towards the transmissive mirror portion 32 were fixed to the positioning member 40, thereby disposing the transmissive mirror portion 32, for which it is desirable to mitigate positional offset, towards the positioning member 40, which undergoes little displacement. Thus, according to the present embodiment, it is possible to mitigate positional offset of the transmissive mirror portion 32 with respect to the second display region 22, and to improve processing dimensional accuracy and assembly accuracy of the display module 10 and support substrate 31.

According to the present embodiment, the end faces 10b and 30b of the display module 10 and the support substrate 31, towards the first display region 21 and opposite to the transmissive mirror portion 32 side, are free ends.

Thus, as a result of the gap between the case 50 and the end faces 10b and 30b of the display module 10 and the support substrate 31 towards the first display region 21, it is possible to absorb displacement (positional offset) in the Z direction of the display module 10 and the end face 31b of the support substrate 31 towards the first display region 21 resulting from thermal expansion or contraction of the display module 10 and the support substrate 31 or thermal expansion or contraction of the positioning member 40. Thus, it is possible to prevent variation due to displacement (positional offset) from affecting the transmissive mirror portion 32.

As described above, the displacement (positional offset) of the first display region 21 side of the display module 10 and the support substrate 31 can be absorbed, and thus, it is possible to mitigate deformation of the display module 10 and the support substrate 31 resulting from heat. Therefore, the display module 10 and the support substrate 31 would not fall out of the case 50 as a result of deformation.

Thus, according to the present embodiment, it is possible to mitigate positional offset between the second display region 22 and the transmissive mirror portion 32, and to improve positioning accuracy of the second display region 22 and transmissive mirror portion 32.

Therefore, in the display device 1 of the present embodiment, a portion of the image to be displayed through one display region (such as the second display region 22) would not be displayed through the other display region (such as the first display region 21), which means that display of images that do not conform to what the content distributor intended would not occur. Thus, the display device 1 of the present embodiment can be suitably used as a display device that displays highly public content such as television broadcasts.

(Modification Example)

Figure 2:
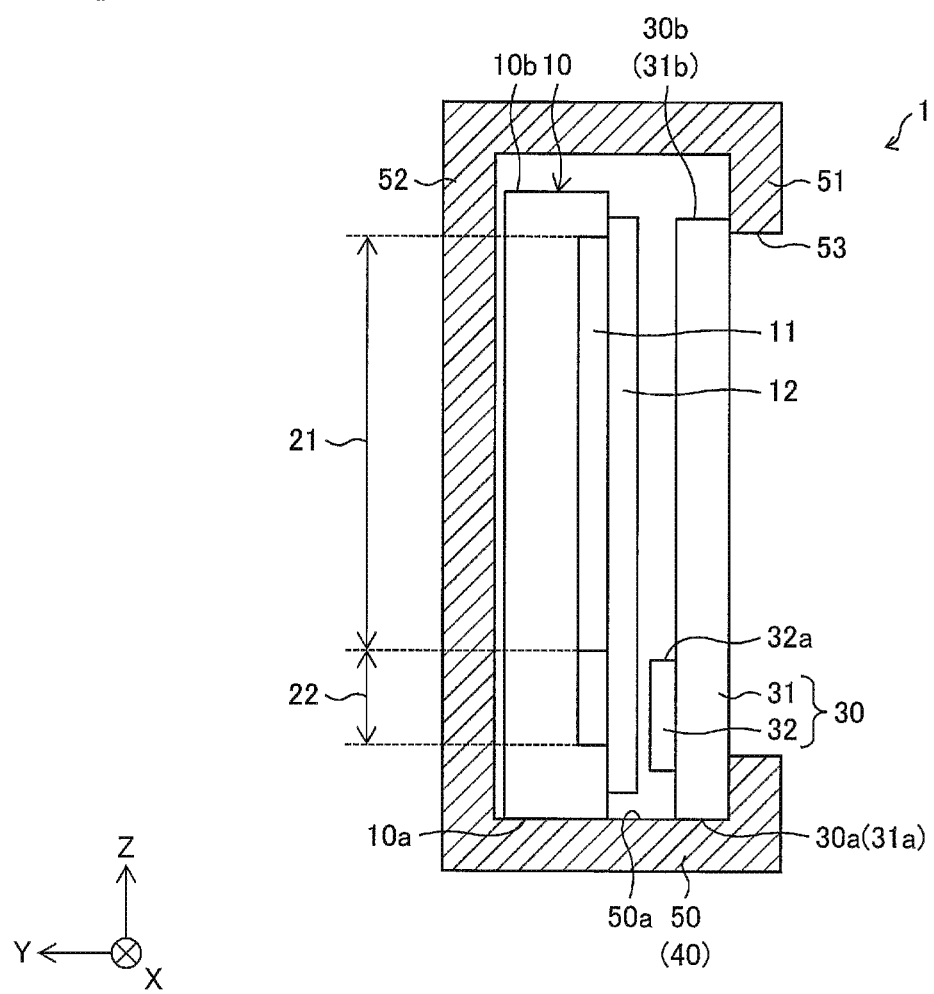
FIG. 2 is a cross-sectional view of a schematic configuration of a display device of a modification example of Embodiment 1 of the present invention.

FIG. 2 is a cross-sectional view of a schematic configuration of a display device 1 of the present modification example. FIG. 2 corresponds to a cross-sectional view of the display device 1 shown in FIG. 1(*a*) along the line A-A.

FIGS. 1(*a*) and 1(*b*) showed an example of a case in which the display device 1 includes the positioning member 40 disposed inside the case 50 and as a part separate from the case 50.

However, the present embodiment is not limited thereto, and as shown in FIG. 2, the case 50 may double as the positioning member 40. In other words, the positioning member 40 may be a portion of the case 50.

That is, the display device 1 of the present modification example includes a display module 10, an optical member 30, and a case 50 that is both a positioning member and a case.

The case 50 of the present modification example is formed such that when a portion of the inner surface thereof is flat, the inner surface is a surface 50*a* (bottom surface of the inner wall of the case 50 in the example shown in FIG. 2) that faces the end faces 10*a* and 30*a* of the display module 10 and the optical member 30 towards the second display region 22 when the display module 10 and the optical member 30 are housed inside the case 50.

In this manner, the surface 50*a* of the case 50 of the present modification example is in planar contact and not point contact with the display module 10 and the optical member 30.

Thus, in the present embodiment, the end faces 10*a* and 30*a* of the display module 10 and the optical member 30, respectively, are in contact with the surface 50*a* and fixed thereto. In the present modification example as well, the surface of the case 50 opposing the end faces 10*b* and 30*b* of the display module 10 and the optical member 30 is formed so as not to contact the display module 10 and the optical member 30, and the end faces 10*b* and 30*b* are free ends that are not fixed anywhere.

According to the present modification example, there is no need to provide a positioning member 40 separate from the case 50, which allows for a reduction in the number of parts and reduction in manufacturing costs.

Also, according to the present modification example, the length of the portion of the front case portion 51 that protrudes from the surface 50*a* of the case 50 towards the display unit 11 can be made less than that of the display device 1 shown in FIG. 1. Thus, according to the present modification example, the area of the portion of the bezel on the lower side of the front case portion 51 (frame area) as seen from the viewer side can be reduced. Therefore, it is possible to improve design flexibility of the front case portion 51.

(Other Modification Examples)

In the present embodiment, an example was described in which the aspect ratio of the first display region 21 was 16:9 (16:9 region), and the aspect ratio of the second display region 22 was 16:1 (16:1 region). However, the aspect ratios of the first display region 21 and the second display region 22 are not limited thereto, and can be formed to a desired size.

Also, in the present embodiment, an example was described in which the second display region 22 is provided below the first display region 21, and the positioning member 40 is provided on the bottom surface of the inner wall of the case 50, or the display module 10 and the optical member 30 are fixed to the bottom surface of the inner wall of the case 50.

However, the positional relationship between the first display region 21 and the second display region 22 is not limited thereto, and a configuration may be adopted in which the second display region 22 is above or to the side of the first display region 21, for example.

In any case, the display module 10 and the optical member 30 simply needs to be fixed to the positioning member 40 on the second display region 22 side (that is, the side towards the transmissive mirror portion 32), which is the transflective display region, among the first display region 21 and the second display region 22. Therefore, the positioning member 40 simply needs to be arranged appropriately according to the arrangement of the first display region 21 and the second display region 22, so as to be arranged towards the transmissive mirror portion 32 side of the display module 10 and the optical member 30.

Also, in the present embodiment, an example was described in which the display module 10 and the optical member 30 were fixed to the positioning member 40, but as long as the end faces 10*a* and 30*a* of the display module 10 and the optical member 30 are in contact with the positioning member 40 such that the display module 10 and the optical member 30 are positioned on the positioning member 40 side, they need not necessarily be fixed to the positioning member 40.

For example, when providing a groove in the positioning member 40 for engaging the display module 10 and the optical member 30, the groove may be provided with play such that the display module 10 and the optical member 30 can move slightly. In such a case, a groove having an area in a plan view slightly larger than the combined area of the end faces 10*a* and 30*a* of the display module 10 and the optical member 30 may be provided in the positioning member 40, with the display module 10 and the optical member 30 being housed in the groove, for example. Also, grooves having areas in a plan view slightly larger than the end faces 10*a* and 30*a* of the display module 10 and the optical member 30 may respectively be provided in the positioning member 40, with the display module 10 and the optical member 30 being housed in the respective grooves.

Additionally, the display module 10 and the optical member 30 may be sandwiched in the case 50 while being in contact with the positioning member 40 to prevent or restrict movement of the display module 10 and the optical member 30.

Depending on the manner of usage for the display device 1, it is preferable that movement up, down, left, or right of the display module 10 and the optical member 30 be prevented or made difficult.

<Embodiment 2>

Another embodiment according to the present invention is as described below with reference to FIGS. 3 to 4. The present embodiment will mainly describe differences from Embodiment 1, and components having the same function as those described in Embodiment 1 are assigned the same reference characters and descriptions thereof will be omitted.

(Schematic Configuration of Display Device 1)

Figure 3:
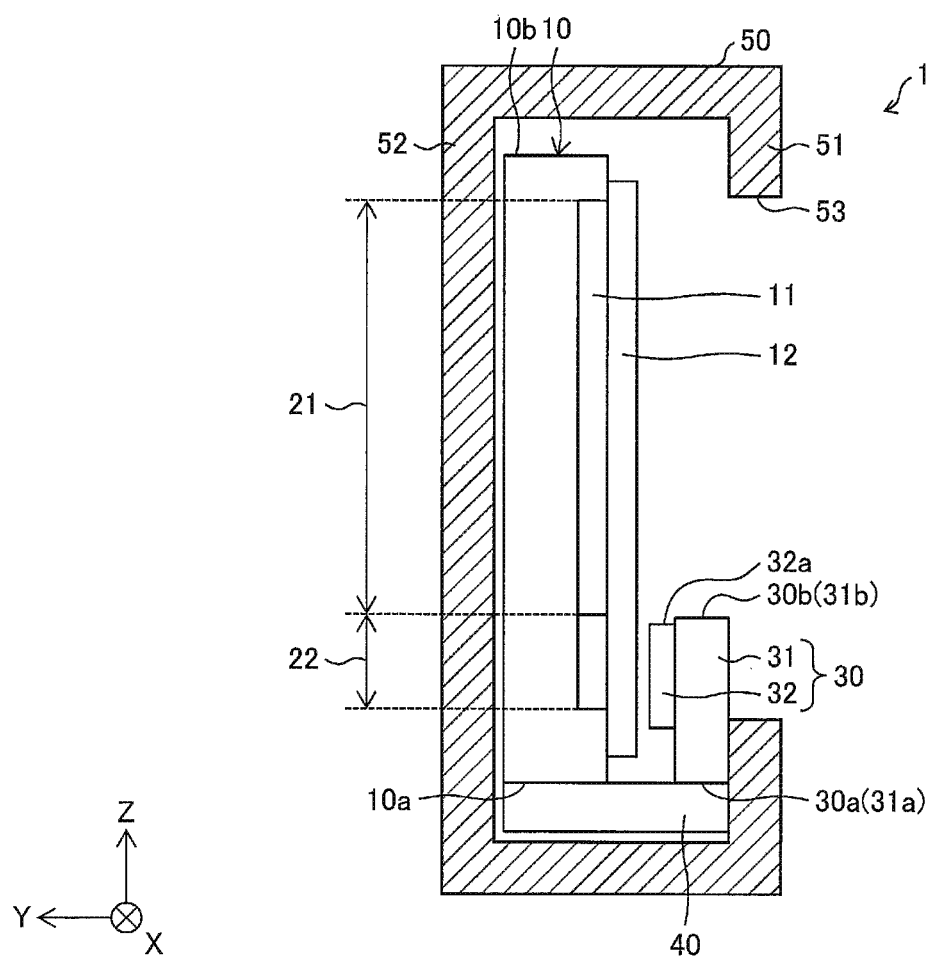
FIG. 3 is a cross-sectional view of a schematic configuration of a display device of Embodiment 2 of the present invention.

FIG. 3 is a cross-sectional view of a schematic configuration of a display device 1 of the present embodiment.

As shown in FIG. 3, the display device 1 of the present embodiment differs from Embodiment 1 in that the support substrate 31 is formed to a size that leaves exposed the first display region 21 (leaves exposed at least a portion of the first display region 21) when the display device 1 is viewed from the viewer side, while covering the second display region 22 (covering only the second display region 22, for example), thereby exposing the first display region 21.

In the present embodiment as well, the transmissive mirror portion 32 is formed to a size allowing it to cover the second display region 22 when the display device 1 is viewed from the viewer side.

Thus, in the present embodiment, the image displayed in the first display region 21 can be seen directly without passing through the support substrate 31. In addition, the image displayed in the second display region 22 can be seen through the transmissive mirror portion 32.

(Effects)

In addition to the effects disclosed in Embodiment 1, the present embodiment exhibits the effect of reducing manufacturing costs compared to Embodiment 1 because the support substrate 31 is low in height.

Another effect exhibited by the present embodiment is the region of the first display region 21 not covered by the support substrate 31 can be viewed without the support substrate 31 therebetween, thereby enabling high display quality.

On the other hand, the support substrate 31 covers the entire surface of the display unit 11 when the display device 1 is viewed from the viewer side as in Embodiment 1, and thus, the present embodiment exhibits the effect of enabling protection of the surface of the display unit 11 (display surface of the display module 10).

(Modification Example)

Figure 4:
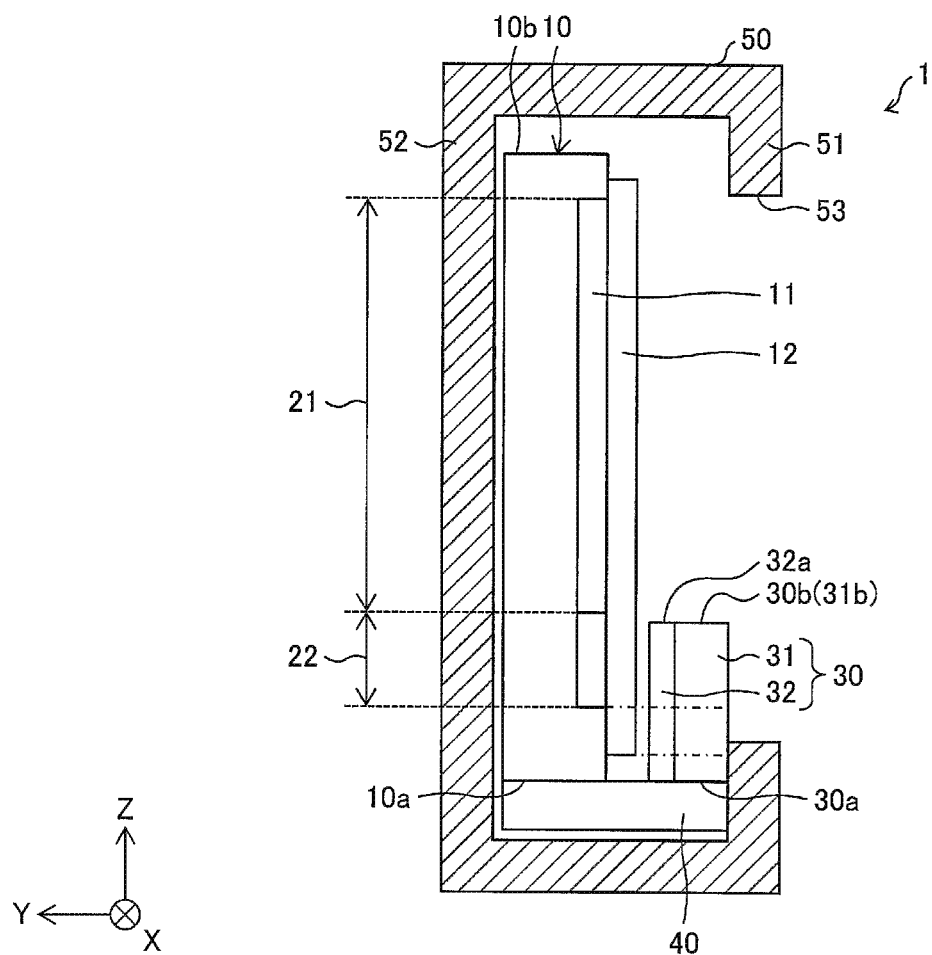
FIG. 4 is a cross-sectional view of a schematic configuration of a display device of a modification example of Embodiment 2 of the present invention.
Figure 5:
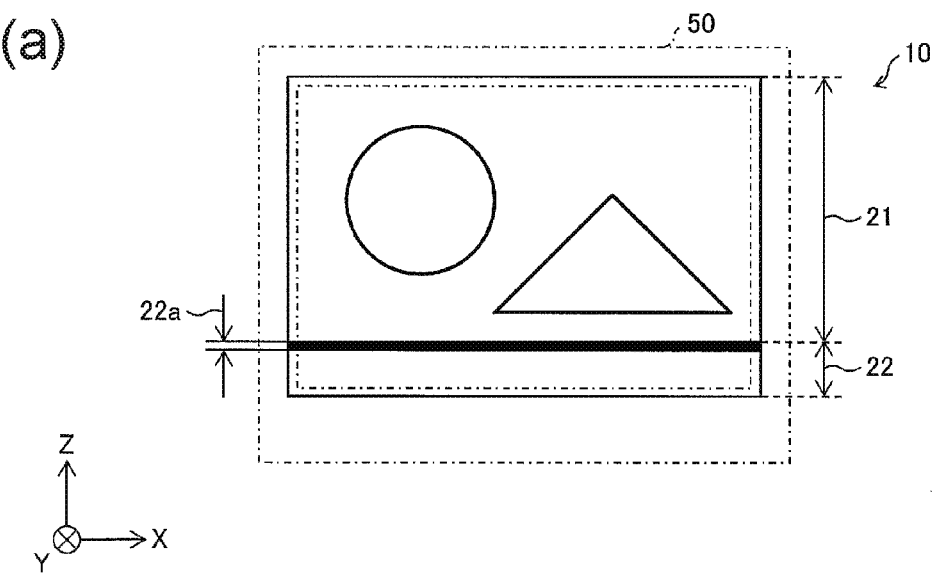
FIG. 5(*a*) is a front view of a schematic configuration of a main portion of a display device of Embodiment 3 of the present invention, and FIG. 5(*b*) is a cross-sectional view of a schematic configuration of a main portion of the display device of Embodiment 3 of the present invention.
Figure 5:
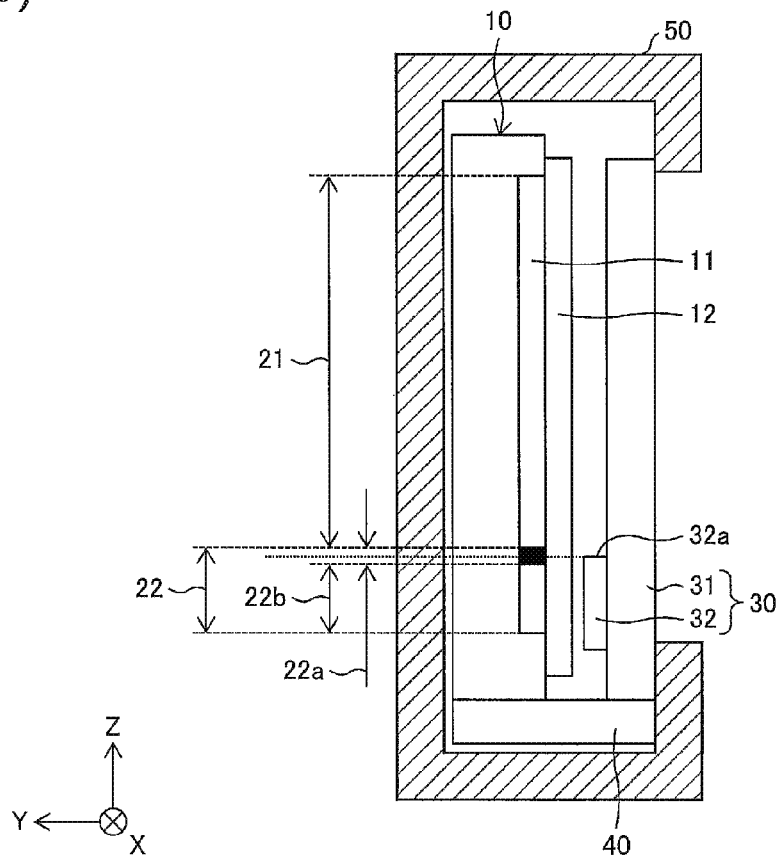

FIG. 4 is a cross-sectional view of a schematic configuration of a display device 1 of the present modification example.

In FIG. 3, an example is shown in which, similar to Embodiment 1, the transmissive mirror portion 32 is provided in a portion of the surface of the support substrate 31 facing the display module 10.

The display device 1 of the present modification example differs from the display device 1 shown in FIG. 3 in that the transmissive mirror portion 32 is provided on the entire surface of the support substrate 31 opposing the display module 10 and in that the lower frame end of the front case portion 51 (that is, the open end of the front case portion 51 towards the positioning member 40) is at a lower point than the lower side (lower edge) of the second display region 22 (towards the positioning member 40).

The transmissive mirror portion 32 may be formed by bonding to the support substrate 31 a sheet-form transmissive mirror member, for example, that is made by vapor deposition of a metal on a support body that is separate from the support substrate 31 and that includes an adhesive layer or the like, may be formed by directly vapor-depositing the metal onto the support substrate 31, or the entire optical member 30 may be a transmissive mirror.

According to the present modification example, manufacturing costs can be reduced compared to Embodiment 1 because the support substrate 31 is low in height. According to the present modification example, it is possible to perform mirror display at the non-display region (frame region) below the second display region 22 (towards the positioning member 40) using the transmissive mirror portion 32, and thus, it is possible to provide a design in which the second display region 22 is integrated with the non-display region (frame region) below (towards the positioning member 40) the second display region 22.

In FIG. 4, an example was shown in which the transmissive mirror portion 32 is provided on the entire surface of the support substrate 31 opposing the display module 10, but effects similar to those described above can be attained by the transmissive mirror portion 32 covering at least a portion of the non-display region closer to the positioning member 40 compared to the second display region 22, and by at least a portion of the non-display region covered by the transmissive mirror portion 32 being left exposed by the case 50.

<Embodiment 3>

Another embodiment according to the present invention is as described below with reference to FIGS. 5(a) and 5(b) to 7. The present embodiment will mainly describe differences from Embodiments 1 and 2, and components having the same function as those described in Embodiments 1 and 2 are assigned the same reference characters and descriptions thereof will be omitted.

(Schematic Configuration of Display Device 1)

FIG. 5(a) is a front view of a schematic configuration of a main portion of a display device 1 of the present embodiment, and FIG. 5(b) is a cross-sectional view of a schematic configuration of a main portion of the display device 1 of the present embodiment. In FIG. 5(a), for ease of depiction, the optical member 30 is omitted and the case 50 is depicted with a one-dot-chain line.

As shown in FIGS. 5(a) and 5(b), the display module 10 of the present embodiment differs from the display device 1 shown in FIGS. 1(a) and 1(b) of Embodiment 1 in that a black image (black line; hereinafter referred to as a "black bar") of a prescribed width, for example, is displayed along a boundary portion between the first display region 21 and the second display region 22 such as the portion of the second display region 22 at the boundary with the first display region 21.

In other words, as shown in FIG. 5(a), in the display module 10 of the present embodiment, a black region 22a constituted of a black bar is formed along the boundary portion of the second display region 22 at the boundary thereof with the first display region 21 in the display module 10 when the display device 1 is viewed from the viewer side, the black region 22a serving as an optical partition.

Specifically, as shown in FIG. 5(b), a black bar is displayed to separate the second display region 22. The black bar is displayed in a portion of the second display region 22 towards the first display region 21, and an image (image data) to normally be displayed in the second display region 22 is displayed in the remaining region of the second display region 22, that is a display region 22b (second display region) other than the black region 22a (first display region) where the black bar is displayed.

The first display region 21 is a 16:9 region with an aspect ratio of 16:9, for example. The second display region 22 is a 16:1 region with an aspect ratio of 16:1, for example, and a black region 22a that displays the black bar and the display region 22b that is the content display region in the 16:1 region are provided in the 16:1 region.

In the present embodiment as well, similar to Embodiments 1 and 2, the height in the Z axis direction from the surface of the positioning member 40 to the end of the transmissive mirror portion 32 (top end 32a) of the optical member 30 is set to be substantially the same as the Z direction height from the surface of the positioning member 40 to the end of the second display region 22 (top end; boundary with first display region 21).

However, the first display region 21 displays main content image in full HD, for example. Thus, it is not preferable that the image displayed in the first display region 21 can be seen through the transmissive mirror portion 32. Thus, it is preferable that, in the boundary between the first display region 21 and the second display region 22, a position offset margin be provided such that the transmissive mirror end (top end 32a of the transmissive mirror portion 32) does not overlap the first display region 21 as a result of positional offset due to thermal expansion or contraction.

Thus, it is preferable that the line width of the black bar (length in the Z axis direction) be set to be able to absorb any positional offset when positioning the second display region 22 with respect to the transmissive mirror portion 32, and it is preferable that the top end 32a of the transmissive mirror portion 32 be provided inside the black region 22a, and more suitably in the center of the black region 22a in the Z axis direction.

As described above, the estimated thermal expansion or contraction of glass during actual use is approximately 1 line. Therefore, the black bar (black region 22a) is set to a width of greater than or equal to 1 line (1920 pixels) of the panel of the display unit 11.

In order to attain a full HD region (1080 lines) at an aspect ratio of 16:9 in a TV image or the like, the second display region 22 needs to display a black bar as described above. Considering that the black bar is displayed within the 120 lines remaining after subtracting the number of lines necessary to display content in a wide ultra-extended graphics array (WUXGA; 1920 pixels), for example, it is preferable that the line width (Z axis direction length) of the black bar (black region 22a) be a maximum of 119 lines, and it is more preferable that the line width be 10 lines or less (10% or less of 120 lines).

(Display of Black Bar)

Next, the method for displaying the black bar of the display module 10 will be described.

Below, an example will be described in which the black bar is acquired as third image data differing from the first image data and the second image data, and the first image data, second image data, and third image data are combined to display a combined image in the display module 10 as shown in FIGS. 5(a) and 5(b).

Figure 6:
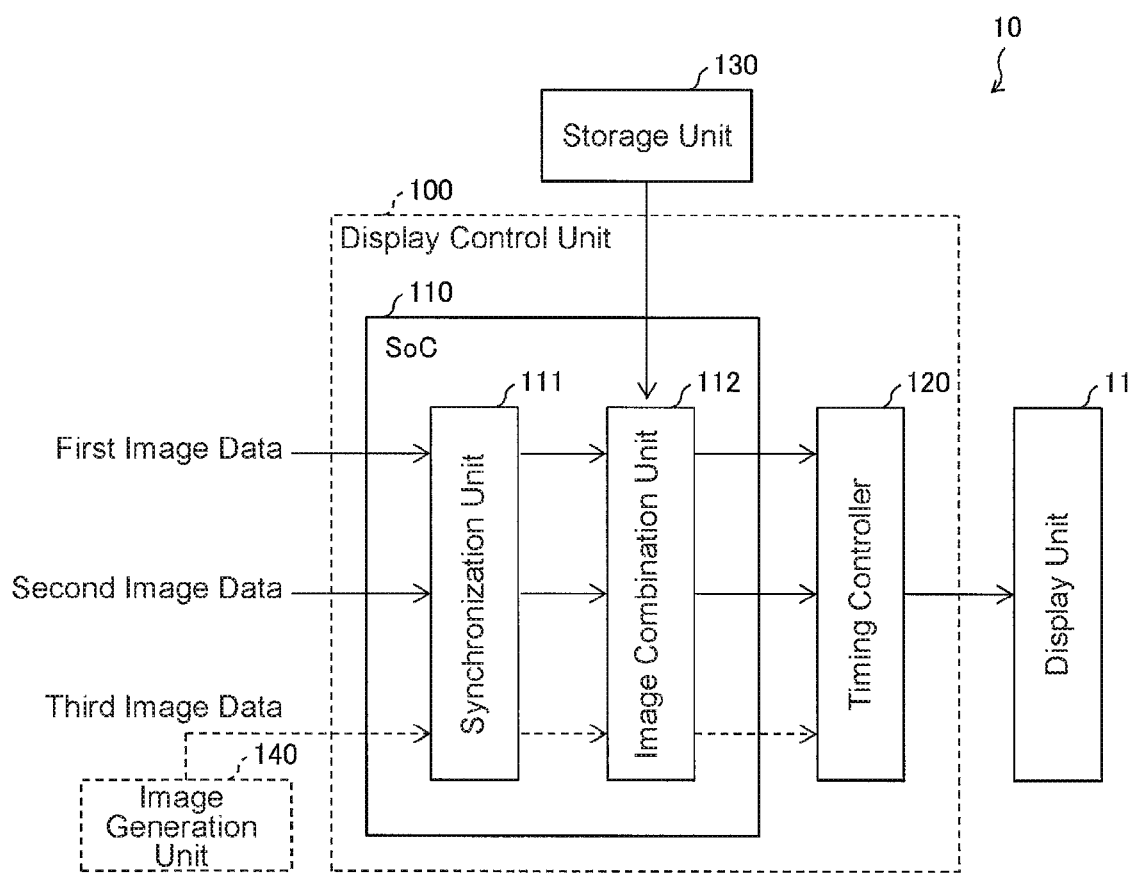
FIG. 6 is a block diagram showing on example of a schematic configuration of a control unit of a display module according to Embodiment 3 of the present invention.

FIG. 6 is a block diagram showing on example of a schematic configuration of a control unit of the display module 10 according to the present embodiment.

In order to display a combined image in the display module 10, as shown in FIG. 6, the display module 10 includes a display control unit 100 (combination unit, control unit) and a storage unit 130, and additionally includes an image generation unit 140 indicated by the dotted line in FIG. 6.

The display control unit 100 causes the display unit 11 to display a combined image in which the first image data, second image data, and black bar (third image data) are combined, for example.

Here, the first image data is image data with an aspect ratio of 16:9, acquired through a tuner or a network such as the internet. Also, the second image data is image data with an aspect ratio of 16:1, acquired through a network such as the internet or generated by the image generation unit 140 inside the device. An example of the black bar is the third image data generated by the image generation unit 140 in the device.

The display control unit 100 includes: a system on chip (SoC) 100 that performs an operation to combine the first image data, the second image data, and the third image data; and a timing controller 120 that adjusts the timing at which the combined image data is outputted to the display unit 11. The SoC is formed by integrating components of an electronic system on one chip.

In the present embodiment, the SoC 110 includes a synchronization unit 111 and an image combination unit 112, and the acquired first image data, second image data, and third image data are synchronized in the synchronization unit 111 and combined by the image combination unit 112 to form one image.

The image combination unit 112 combines the synchronized first image data, second image data, and third image data such that they are respectively displayed in display positions according to display position information stored in advance in the storage unit 130.

The image data combined in the image combination unit 112 is outputted to the timing controller 120 and the timing at which the image data is displayed in the display unit 11 is adjusted by the timing controller 120.

As shown in FIGS. 5(a) and 5(b), the image combined in this manner is displayed such that the first image data having an aspect ratio of 16:9 in the display module 10 is displayed in the first display region 21, and the second image data having an aspect ratio 16:1 and the black bar as the third image data are displayed in the second display region 22, for example.

In the example described above, the black bar was the third image data, which was generated separately from the first image data and the second image data, but the black bar may be included in the second image data. In such a case, the second image data including the black bar may be acquired through a network such as the internet or generated by the image generation unit 140 inside the device. If the second image data including the black bar is acquired through a network such as the internet, the image generation unit 140 can be omitted.

(Effects)

According to the present embodiment, in addition to the effects disclosed in Embodiment 1, a black bar as the black region 22a is displayed along the boundary between the first display region 21 and the second display region 22, thereby preventing the transmissive mirror portion 32 from affecting the display of the first display region 21 and preventing abnormal display of images at the boundary, even if positional offset occurs between the transmissive mirror portion 32 and the second display region 22 as a result of thermal expansion, thermal contraction, or the like, for example. According to the configuration above, even if some positional offset were to occur when positioning the transmissive mirror portion 32, it is possible to hide (absorb) this positional offset by the black region 22a constituted of the black bar. Thus, it is possible to secure a positional offset margin by the black region 22a constituted of the black bar.

(Modification Examples of Partition)

In the present embodiment, a case was described in which the black bar is displayed as third image data, but as long as the first display region 21 and the display region 22b in the second display region 22 are separate, the third image data may be image data of a color other than black.

In other words, the partition may be an image of a color other than black. However, it is preferable that the partition be an image of a single color and a black image, which would make it difficult to see the presence or lack of a boundary at the transmissive mirror portion 32.

In order not to interfere with the display of a main content image as described above, it is preferable that the partition be provided (displayed) in the second display region 22, but may be provided in the first display region 21. As long as the partition is provided at the boundary portion of at least one of the first display region 21 and the second display region 22, the partition may be provided in both display regions.

(Modification Example of Optical Member 30)

Figure 7:
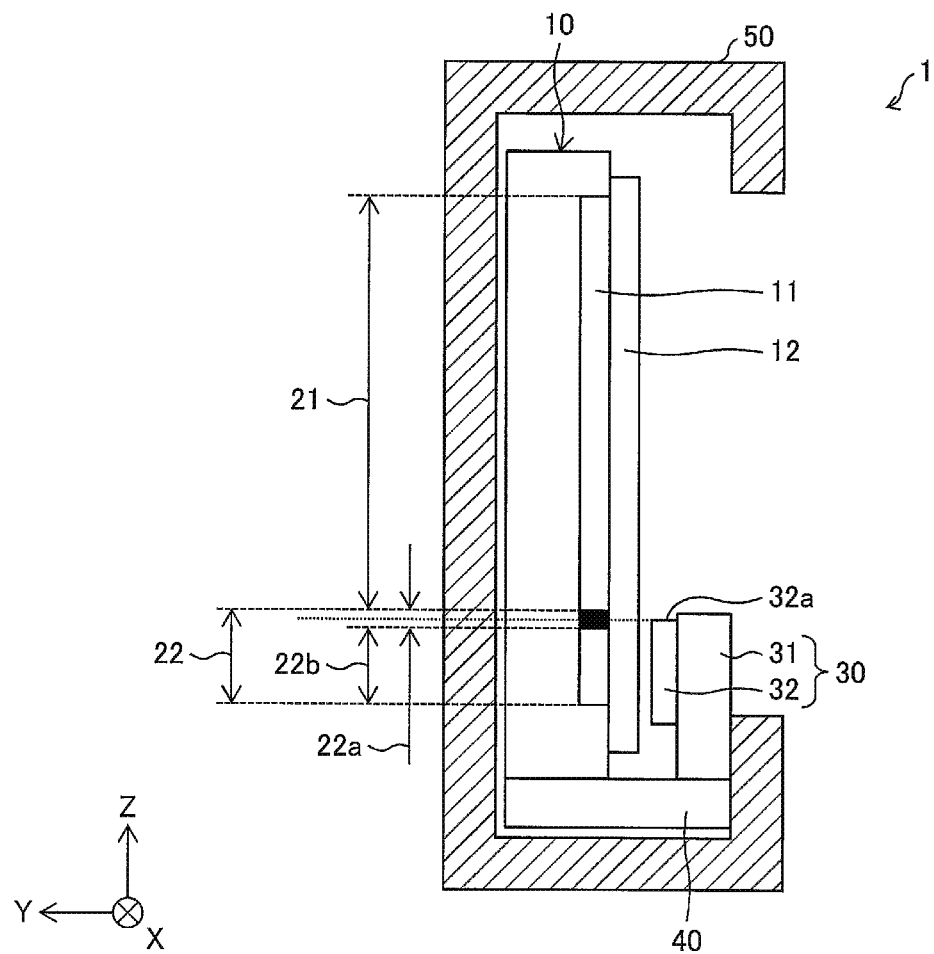
FIG. 7 is a cross-sectional view of a schematic configuration of a display device of a modification example of Embodiment 3 of the present invention.

FIG. 7 is a cross-sectional view of a schematic configuration of a display device 1 of the present modification example.

In FIG. 5(b), an example is shown of a case in which the support substrate 31 covers the entire surface of the display unit 11 as shown in FIG. 1(b).

However, the present embodiment is not limited thereto, and as shown in FIG. 7, a configuration may be adopted in which the support substrate 31 is formed to a size that leaves exposed the first display region 21 (leaves exposed at least a portion of the first display region 21) when the display device 1 is viewed from the viewer side, while covering the second display region 22 (covering only the second display region 22, for example).

In addition to the effects disclosed in the present embodiment, the present modification example exhibits the effect of reducing manufacturing costs compared to Embodiment 1 because the support substrate 31 is low in height, similar to Embodiment 2.

Another effect exhibited by the present modification example is that the region of the first display region 21 not covered by the support substrate 31 can be viewed by a viewer without the support substrate 31 therebetween, thereby enabling high display quality, similar to Embodiment 2.

(Other Modification Examples)

In the present embodiment, a case was illustrated in which the technical configuration shown in FIG. 5(a) was combined with the technical configuration shown in FIG. 3, thereby particularly illustrating differences with FIG. 3 of Embodiment 2. However, the combination of the technical configurations disclosed in the present embodiment and another embodiment is not limited to the modification example above.

As previously described, in the present embodiment, differences from Embodiments 1 and 2 were mainly described, but although no specific mention was made, like Embodiments 1 and 2 the present embodiment is also not limited to the modification example described above, and other modification examples disclosed in Embodiments 1 and 2 may naturally be applied similarly. The same applies to the following embodiments.

<Embodiment 4>

Yet another embodiment according to the present invention is as described below with reference to FIG. 8. The present embodiment will mainly describe differences from Embodiments 1 to 3, and components having the same function as those described in Embodiments 1 to 3 are assigned the same reference characters and descriptions thereof will be omitted.

(Schematic Configuration of Display Device 1)

In Embodiment 3, an example was described in which an optical partition was provided in the boundary portion of the second display region 22 at the boundary thereof with the first display region 21 in the display module 10. By contrast, in the present embodiment, an example will be described in which a physical partition is provided in the boundary portion of the second display region 22 at the boundary thereof with the first display region 21 in the display module 10.

Figure 8:
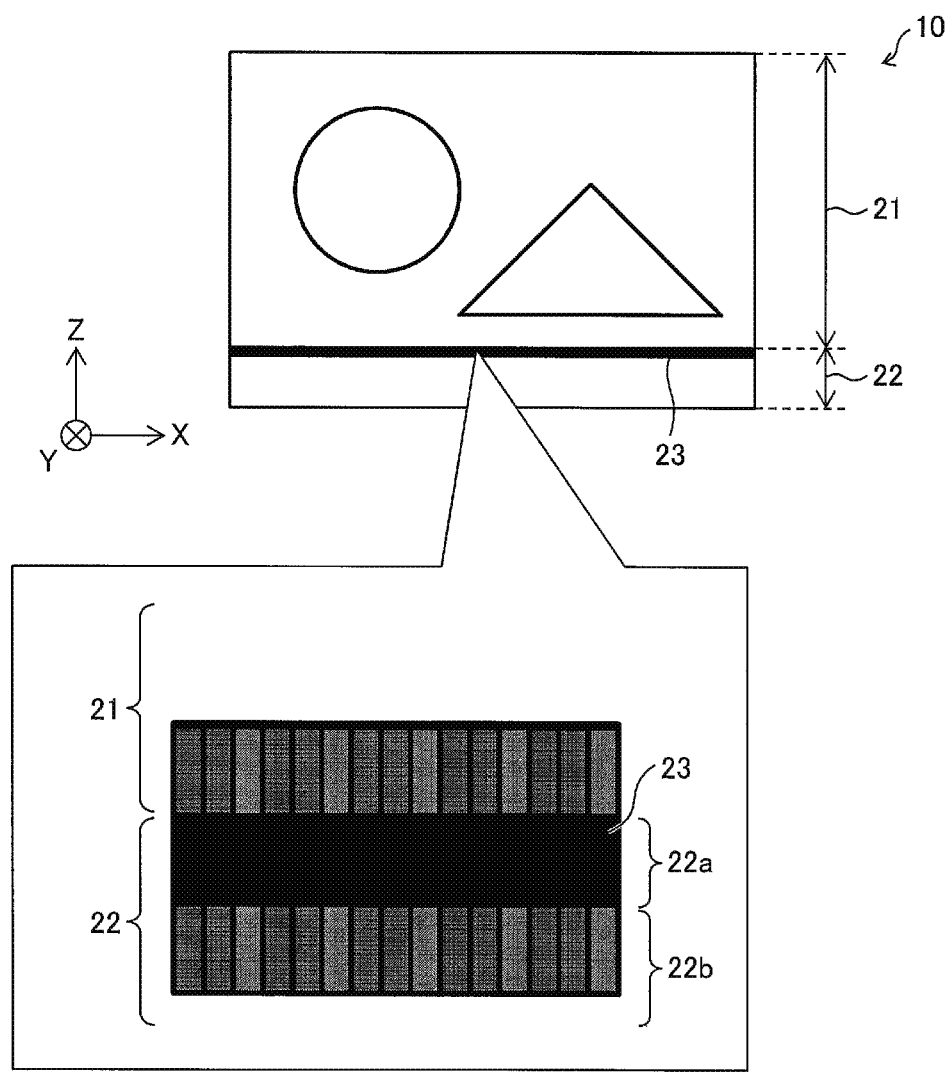
FIG. 8 is a cross-sectional view of a schematic configuration of a display device of Embodiment 4 of the present invention.

FIG. 8 is a cross-sectional view of a schematic configuration of a display device 1 of the present embodiment.

As shown in FIG. 8, in the display device 1 of the present embodiment, a black matrix 23 (light-shielding member) to be the light-shielding region is formed along the boundary portion of the second display region 22 at the boundary thereof with the first display region 21 in the display module 10, when the display device 1 is viewed from the viewer side.

In this manner, in the present embodiment, a light-shielding region as a black region 22a is formed along the boundary portion of the second display region 22 at the boundary thereof with the first display region 21 in the display module 10 when the display device 1 is viewed from the viewer side.

The second display region 22 is a 16:1 region with an aspect ratio of 16:1, for example, and a black region 22a constituted of the black matrix 23 and the display region 22b that is the content display region are provided in the 16:1 region.

The black matrix 23 may have a line width enabling it to be viewed as a black region 22a (light-shielding region) when the display device 1 is viewed from the viewer side, and more specifically, may have a width enabling the first display region 21 to be separated from the display region 22b of the second display region 22.

In this manner, it is possible to mitigate abnormal display of images due to positional offset between the image end (boundary between the first display region 21 and the second display region 22) and the transmissive mirror end resulting from thermal expansion or contraction, but it is preferable that the black matrix 23 by formed to a line width enabling absorption of positional offset between the image end and the transmissive mirror end resulting from thermal expansion or contraction. Thus, in the present embodiment as well, it is preferable that the black region 22a have a line width greater than or equal to 1 line.

Additionally, in the present embodiment as well, it is preferable that the line width of the black region 22a (length in the Z axis direction) be a maximum of 119 lines, and even more preferable that the line width be 10 lines or less.

(Effects)

According to the present embodiment as well, the black region 22a is provided in the boundary portion in the second display region 22 of the display module 10, along the boundary between the first display region 21 and the second display region 22 as seen from the viewer side of the display device 1, thereby preventing the transmissive mirror portion 32 from affecting the display of the first display region 21 and preventing abnormal display of images at the boundary, even if positional offset occurs between the transmissive mirror portion 32 and the second display region 22 as a result of thermal expansion, thermal contraction, or the like, for example. According to the configuration above, even if some positional offset were to occur when positioning the transmissive mirror portion 32, it is possible to hide (absorb)

this positional offset by the black region 22a. Thus, it is possible to secure a positional offset margin by the black region 22a.

Also, according to the present embodiment, by using the black matrix 23 as the black region 22a, the inclusion of the third image data in the combination process, which was necessary in Embodiment 3, is no longer necessary, and it is possible to secure a physical positional offset margin regardless of the image. Also, by using the black matrix 23 as the light-shielding member, there is no need for any new parts or processes in order to provide the partition, allowing the display device 1 provided with the partition to be manufactured without any major design modifications. Thus, it is possible to suppress increases in manufacturing costs.

(Modification Example)

In the present embodiment, an example was described in which the light-shielding region to be the black region 22a was formed using the black matrix 23, but as long as the light-shielding region can be seen when the display device 1 is viewed from the viewer side, the light-shielding region is not limited to the black matrix 23. A reflective member made of metal may be provided instead of the black matrix 23 as the light-shielding member forming the light-shielding region, for example.

In the present embodiment as well, in order not to interfere with the display of a main content image, it is preferable that the black matrix 23 be provided in the second display region 22, but the black matrix 23 may be provided in the first display region 21. In the present embodiment, as long as the black matrix 23, which is the partition, is provided at the boundary portion of at least one of the first display region 21 and the second display region 22, the partition may be provided in both display regions.

<Embodiment 5>

Another embodiment according to the present invention is as described below with reference to FIGS. 9(a) and 9(b). The present embodiment will mainly describe differences from Embodiments 1 to 4, and components having the same function as those described in Embodiments 1 to 4 are assigned the same reference characters and descriptions thereof will be omitted.

In Embodiment 4, an example was described in which a physical partition was provided in the display panel of the display module 10 to physically separate the first display region 21 from the display region 22b of the second display region 22.

By contrast, in the present embodiment, an example will be described in which a physical partition is provided outside the display panel to visually separate the first display region 21 from the display region 22b of the second display region 22 when the display device 1 is viewed from the viewer side.

(Schematic Configuration of Display Device 1)

Figure 9:
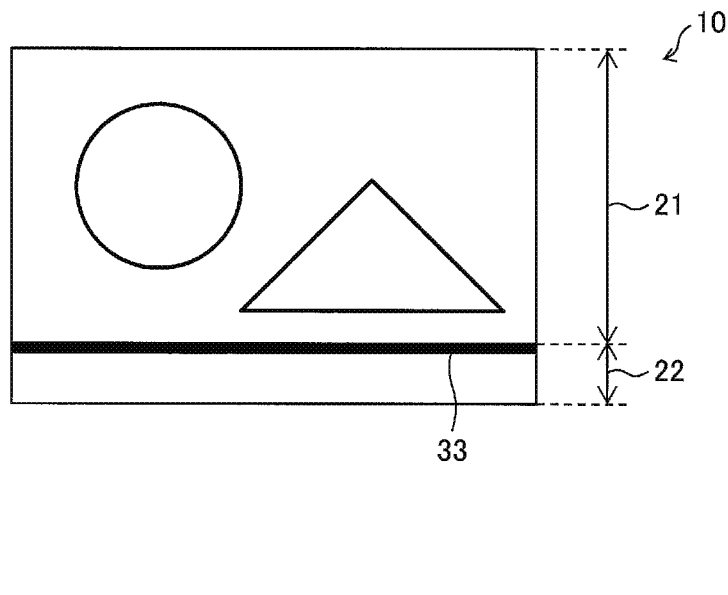
FIG. 9(*a*) is a front view of a schematic configuration of a main portion of a display module in a display device of Embodiment 5 of the present invention, and FIG. 9(*b*) is a cross-sectional view of a schematic configuration of a main portion of the display device of Embodiment 5 of the present invention.
Figure 9:
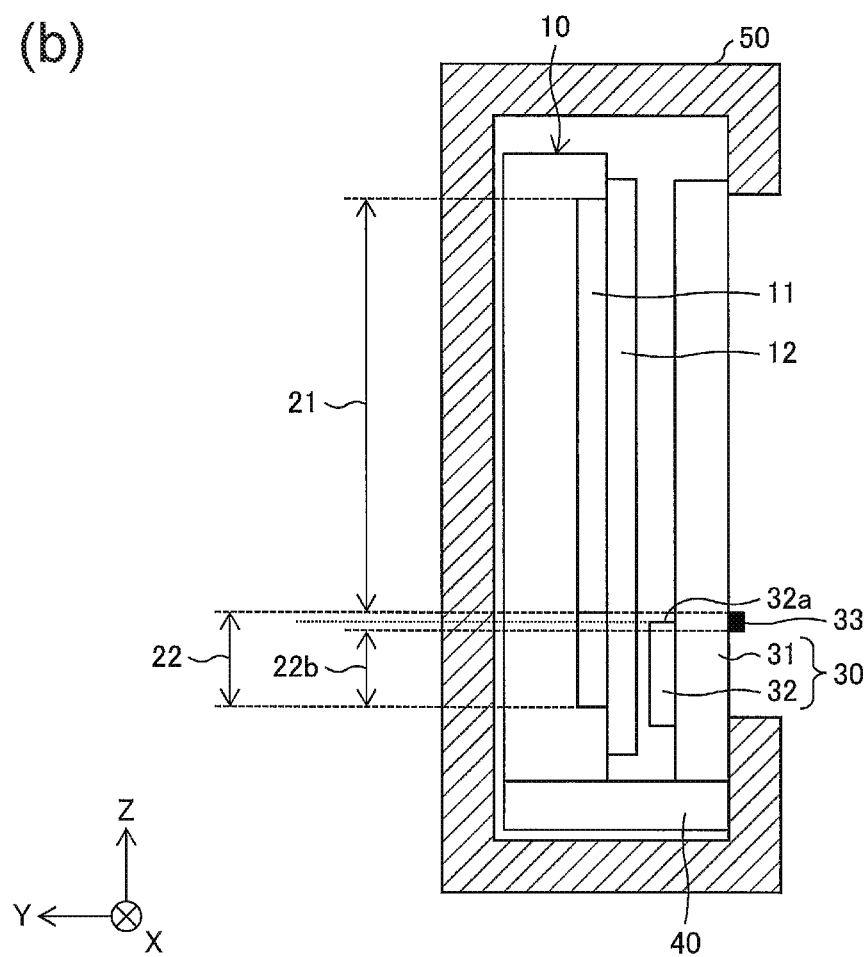

FIG. 9(a) is a front view of a schematic configuration of a main portion of a display module 10 in a display device 1 of the present embodiment, and FIG. 9(b) is a cross-sectional view of a schematic configuration of a main portion of the display device 1 of the present embodiment.

The display device 1 shown in FIGS. 9(a) and 9(b) has a structure 33 formed as a partition along the boundary between the first display region 21 and the second display region 22 of the display module 10 on the surface of the support substrate 31 on the viewer side (that is the surface opposite to where the transmissive mirror portion 32 is formed).

The structure 33 may be formed by printing or vapor deposition of a coating material, for example, on the support substrate 31, or may be a rod-shaped structure made of a material such as resin or metal attached to the support substrate 31.

The structure 33 may be a black-like color such as black itself, but is not limited to this color, and it is preferable that a color and material matching the overall design of the display device 1 be selected. The structure 33 may be a metal bar having a metallic shine matching the design of the case, and may be provided with a surface pattern. In addition, the structure is not limited to being a single color.

The width of the structure 33 in the Z axis direction, like the width of the partition in the Z axis direction in Embodiments 3 and 4, simply needs to have a size allowing the first display region 21 to be separate from the display region 22b of the second display region 22, but it is preferable that the structure 33 be formed to a size enabling absorption of positional offset of the image edge (boundary between first display region 21 and second display region 22) resulting from thermal expansion or contraction. Thus, in the present embodiment as well, it is preferable that the width of the structure 33 in the Z axis direction be greater than or equal to 1 line.

Additionally, in the present embodiment as well, it is preferable that the width of the structure 33 in the Z axis direction be a maximum of 119 lines, and even more preferable that the width be 10 lines or less.

(Effects)

According to the present embodiment as well, the structure 33 is provided in the boundary portion in the second display region 22 of the display module 10, along the boundary between the first display region 21 and the second display region 22 as seen from the viewer side of the display device 1, thereby preventing the transmissive mirror portion 32 from affecting the display of the first display region 21 and preventing abnormal display of images at the boundary, even if positional offset occurs between the transmissive mirror portion 32 and the second display region 22 as a result of thermal expansion, thermal contraction, or the like, for example. According to the configuration above, even if some positional offset were to occur when positioning the transmissive mirror portion 32, it is possible to hide (absorb) this positional offset by the structure 33. Thus, it is possible to secure a positional offset margin by the structure 33.

Also, according to the present embodiment, by using the structure 33 as a partition to separate the first display region 21 from the second display region 22, it is possible to secure a positional offset margin physically and with ease, regardless of the image.

In particular, by providing the structure 33 on the optical member 30, it is possible to use an existing display module 10 as is, and there is no need for design modification during manufacturing of the display module 10. Thus, the structure 33 can be adopted with ease.

(Modification Example)

In FIGS. 9(a) and 9(b), an example was described in which the structure 33 was provided in the boundary portion of the second display region 22 at the boundary thereof with the first display region 21 in the display module 10. In the present embodiment as well, in order not to interfere with the display of a main content image, it is preferable that the structure 33 as the partition be provided in the second display region 22, but the structure 33 may be provided in the first display region 21. Alternatively, the structure 33 may be formed to straddle both display regions so as to cover the boundary between the first display region 21 and the second display region 22.

In FIGS. 9(a) and 9(b), the structure 33 may be formed on the surface of the support substrate 31 opposite to where the transmissive mirror portion 32 is formed, so as to cover the top end 32a of the transmissive mirror portion 32.

Alternatively, although not shown, the structure 33 may be provided on the surface of a protective plate or the like (not shown) provided on the surface of the polarizing plate 12 or the display module 10, along the boundary between the first display region 21 and the second display region 22 of the display module 10.

However, in order to prevent positional offset from parallax, it is preferable that the transmissive mirror portion 32 be provided as close to the second display region 22 as possible, because this allows the transmissive mirror portion 32 and the second display region 22 to be disposed as close to each other as possible.

<Embodiment 6>

Another embodiment according to the present invention is as described below with reference to FIGS. 10(a) and 10(b). The present embodiment will mainly describe differences from Embodiments 1 to 5, and components having the same function as those described in Embodiments 1 to 5 are assigned the same reference characters and descriptions thereof will be omitted.

(Schematic Configuration of Display Device 1)

Figure 10:
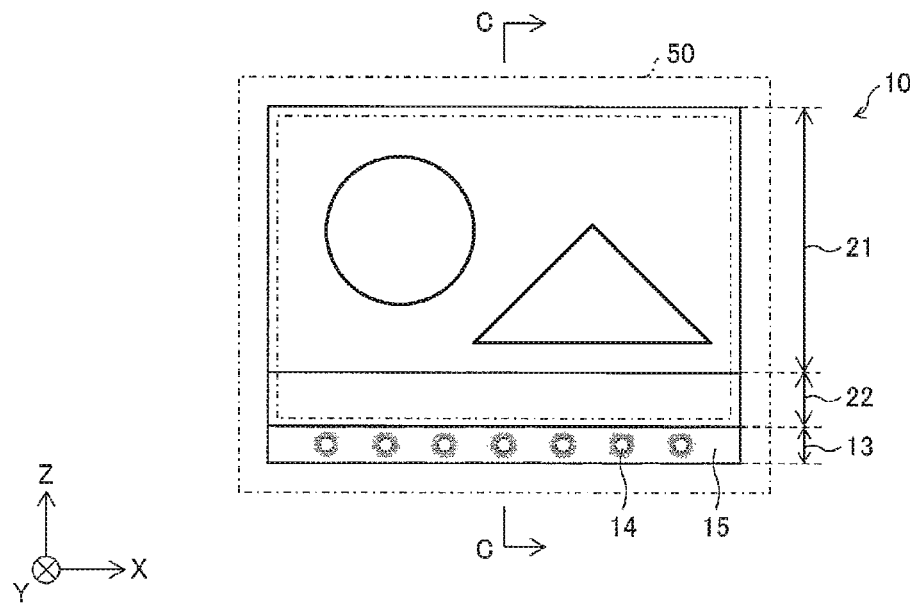
FIG. 10(*a*) is a front view of a schematic configuration of a main portion of a display module in a display device of Embodiment 6 of the present invention, and FIG. 10(*b*) is a cross-sectional view of a schematic configuration of a main portion of the display device of Embodiment 6 of the present invention.
Figure 10:
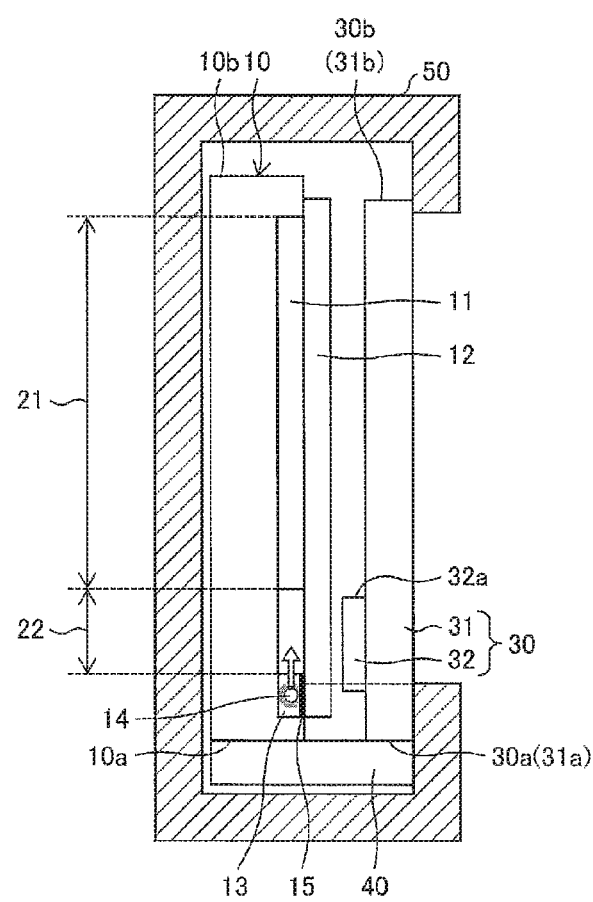

FIG. 10(a) is a front view of a schematic configuration of a main portion of a display module 10 in a display device 1 of the present embodiment, and FIG. 10(b) is a cross-sectional view of a schematic configuration of a main portion of the display device 1 of the present embodiment.

As shown in FIGS. 10(a) and 10(b), the display module 10 according to the present embodiment has a structure in which a backlight 13 is provided as a light-emitting portion (illumination device, light source) on a portion of the display module 10 closer to the positioning member 40 (closer to the end face 10a) than the second display region 22.

Thus, the display panel in the display module 10 of the present embodiment is a transmissive display-type display panel using a backlight. As long as the display panel is of a transmissive display type using a backlight, there is no special limitation thereto. Examples of the display panel can include a transmissive display-type liquid crystal panel, for example.

The backlight 13 is provided with LEDs (light-emitting diodes) as the light-emitting bodies 14, for example. However, the light-emitting bodies 14 are not limited thereto, and may be a fluorescent lamp or a laser light source, for example.

A guide 15 is provided on the polarizing plate 12 side of the backlight 13. In this manner, the light from the backlight 13 is radiated from the edge of the backlight 13 towards the display unit 11 in a direction parallel to the substrate surface of the display panel, and is emitted outside (to the front of the display unit 11) through the display unit 11 (color filters), and thus, light from the backlight 13 does not pass directly through the polarizing plate 12 to the outside.

(Effects)

According to the present embodiment, by providing the backlight 13, which is a source of heat, closer to the positioning member 40 than the second display region 22 in the display module 10 in this manner, it is possible to suppress warping of the first display region 21, which is in a position away from this heat source. Also, by the transmissive mirror portion 32 being provided towards the backlight 13 and facing the second display region 22, it is possible to make display unevenness visually less apparent using the transmissive mirror portion 32, even if display unevenness occurs as a result of light leakage due to thermal warping that has occurred towards the second display region 22.

(Modification Example)

An example was depicted in FIGS. 10(a) and 10(b) in which the backlight 13 was provided on the lower end of the display module 10, but the present embodiment is not limited thereto.

The backlight 13 simply needs to be provided closer to the positioning member 40 than the second display region 22, or in other words, in a portion of the display module 10 towards the end face 10a towards the second display region 22.

Therefore, if the second display region 22 is provided above or to the side of the first display region 21, for example, then the position of the backlight 13 is modified according to the arrangement of the first display region 21 and the second display region 22.

<Summary>

A display device 1 according to a first aspect of the present invention includes: a display module 10 having a display surface provided with first and second display regions (first display region 21, second display region 22); a transparent member (optical member 30) having a transmissive mirror portion 32 that faces and covers the second display region (second display region 22); and a positioning member 40 by which the display module 10 and the transparent member 40 are positioned with respect to each other, the display module 10 and the transparent member being, respectively, in contact with the positioning member 40 at end faces 10a and 30a thereof towards the second display region (that is, the end faces 10a and 30a towards the transmissive mirror portion 32 whereas end faces 10b and 30b towards the first display region are free ends that are not in contact anywhere.

According to this configuration, by placing the display module 10 and the transparent member in contact with the positioning member 40 in a state in which the transmissive mirror portion 32 is provided on the transparent member so as to face and cover the second display region, it is possible to set the transparent member provided with the transmissive mirror portion 32 as close as possible to the display surface of the display module 10 without directly bonding the transmissive mirror to the polarizing plate. In this manner, it is possible to attain a parallaxless effect equivalent to when the polarizing plate is directly bonded to the transmissive mirror.

Furthermore, by the configuration above, compared to directly bonding the transmissive mirror to the polarizing plate, it is possible to mitigate positional offset between the boundary between the first display region and the second display region, and the transmissive mirror edge.

Also, according to the configuration above, by placing the display module 10 and the transparent member in contact with the positioning member 40, it is possible to position the display module 10 and the transparent member with ease.

Additionally, by the configuration above, by disposing the second display region and the transmissive mirror portion 32 towards the positioning member 40, which undergoes little displacement, positional offset of the transmissive mirror portion 32 with respect to the second display region is suppressed, and the processing dimensional accuracy and assembly accuracy of the display device 1 can be improved.

According to the configuration above, the end faces 10b and 30b of the display module 10 and the transparent member towards the first display region are free ends, and thus, displacement variation (positional offset) of the end faces 10b and 30b towards the first display region resulting from thermal expansion and thermal contraction can be prevented from reaching the second display region (transmissive mirror portion 32).

Thus, according to the configuration above, it is possible to mitigate positional offset between the second display region and the transmissive mirror portion 32, and to improve positioning accuracy of the second display region and transmissive mirror portion 32.

In the first aspect, a display device 1 of a second aspect of the present invention may be configured such that a partition that separates the first display region from the second display region (an image such as a black bar based on third image data displayed in the black region 22*a*, a light-shielding member such as a black matrix 23 that forms a light-shielding region, a structure 33, or the like, for example) is provided along a boundary portion between the first display region (first display region 21) and the second display region (second display region 22) in the display module 10, as viewed from a viewer side.

According to this configuration, by providing the partition along the boundary between the first display region and the second display region, abnormal display of images at the boundary can be prevented even if positional offset occurs between the transmissive mirror portion 32 and the second display region as a result of thermal expansion, thermal contraction, or the like, for example. According to the configuration above, even if some positional offset were to occur when positioning the transmissive mirror portion 32, it is possible to hide (absorb) this positional offset by the partition. Thus, it is possible to secure a positional offset margin by the partition.

In the second aspect, a display device 1 of a third aspect of the present invention may be configured such that the partition is an optical partition formed by an image, and the display module 10 includes a combination unit (display control unit 100) that combines, with first image data to be displayed in the first display region (first display region 21) and second image data to be displayed in the second display region (display region 22*b* in second display region 22), third image data to be displayed as the partition in a boundary portion (black region 22*a*, for example) of at least one of the first and second display regions facing another of the first and second display regions.

According to the configuration above, the third image data for separating the first display region from the second display region can be displayed in the boundary portion (the boundary portion in at least one of the first display region and the second display region facing the other of the first display region and the second display region) between the first display region and the second display region. Thus, it is possible to secure the positional offset margin by the partition.

In the second aspect, a display device 1 of a fourth aspect of the present invention may be configured such that the partition is a physical partition.

According to this configuration, it is possible to physically secure the positional offset margin regardless of the image to be displayed in the first and second display regions.

In the fourth aspect, a display device 1 of a fifth aspect of the present invention may be configured such that a light-shielding region made of a light-shielding member (such as the black matrix 23) that functions as the partition is provided along the boundary portion (such as the black region 22*a*) between the first display region (first display region 21) and the second display region (second display region 22) in the display module 10.

According to the configuration above, a light-shielding region made of the light-shielding member can be provided along the boundary portion between the first display region and the second display region in the display module 10. Thus, according to this configuration, it is possible to physically secure the positional offset margin regardless of the image to be displayed in the first and second display regions, using the light-shielding member (light-shielding region formed by the light-shielding member).

In the fifth aspect, a display device 1 of a sixth aspect of the present invention may be configured such that the light-shielding member is a black matrix 23.

According to this configuration, there is no need to provide a new part or new step for providing the partition in the display module 10. As a result, it is possible to manufacture the display device 1 provided with the partition without any major design modifications. Thus, it is possible to suppress increases in manufacturing costs.

In the fourth aspect, a display device 1 of a seventh aspect of the present invention may be configured such that a structure 33 that functions as the partition is provided on the display module 10 or the transparent member (optical member 30), along the boundary portion between the first display region (first display region 21) and the second display region (second display region 22), as viewed from the viewer side.

According to this configuration, using the structure 33, it is possible to physically secure the positional offset margin with ease regardless of the image to be displayed in the first and second display regions.

In particular, by providing the structure 33 on the transparent member, it is possible to use an existing display module 10 as is, and there is no need for design modification during manufacturing of the display module 10. Thus, the structure 33 can be adopted with ease.

In any of the first to seventh aspects, a display device 1 of an eighth aspect of the present invention may be configured such that the display module 10 is provided with a light source (backlight 13) closer to the positioning member 40 than the second display region (second display region 22).

According to this configuration, by providing the light source as a source of heat closer to the positioning member 40 than the second display region in the display module 10, it is possible to suppress warping of the first display region, which is in a position away from the heat source. Also, by the transmissive mirror portion 32 being provided towards the light source and facing the second display region, it is possible to make display unevenness visually less apparent using the transmissive mirror portion 32, even if display unevenness occurs as a result of light leakage due to thermal warping that has occurred towards the second display region.

In any of the first to eighth aspects, a display device 1 of a ninth aspect of the present invention may be configured such that the transparent member (optical member 30) includes a support substrate 31 having a size covering the first and second display regions (first display region 21, second display region 22), as viewed from a viewer side, with the transmissive mirror portion 32 being formed on a portion of the support substrate 31.

According to this configuration, it is possible to protect the display surface of the display module 10 using the support substrate.

In any of the first to eighth aspects, a display device 1 of a tenth aspect of the present invention may be configured such that the transparent member (optical member 30) includes a support substrate 31 having a size that covers the second display region (second display region 22) while leaving exposed at least a portion of the first display region (first display region 21), as viewed from a viewer side, with the transmissive mirror portion 32 being formed on at least a portion of the support substrate 31.

According to this configuration, the manufacturing costs can be suppressed compared to the ninth aspect.

Also, the region of the first display region not covered by the support substrate 31 can be viewed by a viewer without the support substrate 31 therebetween, thereby enabling high display quality.

In the tenth aspect, it is preferable that a display device 1 of an eleventh aspect of the present invention be configured such that the transmissive mirror portion 32 covers at least a portion of the non-display region towards the positioning member 40 compared to the second display region (second display region 22), and at least a portion of the non-display region covered by the transmissive mirror portion 32 is left exposed by the case.

According to the configuration above, it is possible to perform mirror display at the non-display region (frame region) towards the positioning member 40 compared to the second display region using the transmissive mirror portion 32, and thus, it is possible to provide a design in which the second display region is integrated with the non-display region (frame region) towards the positioning member 40 compared to the second display region.

In any of the first to eleventh aspects, a display device 1 of a twelfth aspect of the present invention may be configured such that the positioning member 40 is a portion of the case 50.

According to this configuration, there is no need to provide a positioning member 40 separate from the case 50, which allows for a reduction in the number of parts and reduction in manufacturing costs.

Also, according to this configuration, the area (frame area) of the portion of the bezel on the lower side of the case (front case portion 51) as seen from the viewer side can be reduced. Therefore, it is possible to improve design flexibility of the frame portion of the case (front case portion 51).

The present invention is not limited to the embodiments described above, and various modifications can be made without departing from the scope of the claims. Therefore, embodiments obtained by appropriately combining the techniques disclosed in different embodiments are included in the technical scope of the present invention. Furthermore, by combining techniques disclosed in the respective embodiments, it is possible to form new technical characteristics.

INDUSTRIAL APPLICABILITY

The display device according to the present invention can be suitably used in an electronic device such as a TV or a mobile device, in which a transmissive mirror portion is provided so as to oppose a portion of the display surface of a display module.

DESCRIPTION OF REFERENCE CHARACTERS

1 display device
10 display module
10a end face
11 display region
12 polarizing plate
13 backlight (light source)
14 light-emitting body
15 guide
21 first display region
22 second display region
22a black region
22b display region
23 black matrix (light-shielding member, partition)
30 optical member (transparent member)
30a end face
31 support substrate
31a end face
31b end face
32 black matrix (partition)
32 transmissive mirror portion
32a top end
33 structure (partition)
40 positioning member
50 case
50a surface
51 front case portion
52 rear case portion
53 opening
100 display control unit
111 synchronization unit
112 image combination unit
120 timing controller
130 storage unit
140 image generation unit

What is claimed is:

1. A display device, comprising:
   a display module having a display surface provided with first and second display regions;
   a transparent substrate having a transmissive mirror portion formed thereon in an area that faces and covers the second display region; and
   a positioning member that fixes the display module and the transparent substrate relative to each other,
   wherein end faces of the display module and the transparent substrate adjacent to the second display region are in contact with the positioning member, whereas end faces of the display module and the transparent substrate adjacent to the first display region are free ends that are not in contact anywhere.

2. The display device according to claim 1, wherein a physical partition or an image of a partition that defines a boundary between the first display region and the second display region as seen from a viewer's side is provided on the display module or the transparent substrate.

3. The display device according to claim 2,
   wherein the image of the partition is displayed on the display module, and
   wherein the display module includes a combination unit that combines, with first image data to be displayed in the first display region and second image data to be displayed in the second display region, third image data to be displayed as the partition that defines the boundary between the first display region and the second display region.

4. The display device according to claim 2, wherein the physical partition is provided.

5. The display device according to claim 4, wherein the physical partition is a light-shielding member forming a light-shielding region on the display module.

6. The display device according to claim 5, wherein the light-shielding member is made of a same material as a black matrix formed in the second display region.

7. The display device according to claim 1, wherein the display module includes a light source closer to the positioning member than the second display region.

8. The display device according to claim 1, wherein the transparent substrate has a size covering the first and second display regions, as seen from a viewer's side.

9. The display device according to claim 1, wherein the transparent substrate has a size covering the second display region while exposing at least a portion of the first display region as seen from a viewer's side.

10. The display device according to claim 1, further comprising:
   a case,
   wherein the positioning member is a portion of the case.

* * * * *